United States Patent [19]

Koda et al.

[11] Patent Number: 4,954,724

[45] Date of Patent: Sep. 4, 1990

[54] OPTICAL FUEL GAUGE FOR VEHICLES

[76] Inventors: Hideo H. Koda, 1880 Century Park East, Ste. 519, Los Angeles, Calif. 90067; Bill Yoshida, 6242 Warner Ave., Apt. 23 E, Huntington Beach, Calif. 92647

[21] Appl. No.: 456,945

[22] Filed: Dec. 26, 1989

Related U.S. Application Data

[63] Continuation of Ser. No. 178,144, Apr. 6, 1988, abandoned.

[51] Int. Cl.$^5$ .................................................. G01N 15/06
[52] U.S. Cl. ................................. 250/577; 73/293; 250/901
[58] Field of Search ............... 250/227, 577, 901; 73/293; 340/619; 356/133

[56] References Cited

U.S. PATENT DOCUMENTS

| | | | |
|---|---|---|---|
| 3,713,338 | 1/1973 | Kind | 73/293 |
| 3,794,428 | 2/1974 | Giesecke | 73/293 |
| 3,995,168 | 11/1976 | Neuscheler et al. | 250/901 |
| 4,156,149 | 5/1979 | Vaccari | 250/577 |
| 4,193,004 | 3/1980 | Lobdell et al. | 250/577 |
| 4,344,429 | 8/1982 | Gupton et al. | 250/577 |
| 4,440,022 | 4/1984 | Mason | 250/577 |
| 4,450,722 | 5/1984 | Keyes, IV et al. | 250/577 |
| 4,630,476 | 12/1986 | Moore | 250/577 |
| 4,654,535 | 3/1987 | Wolske | 250/577 |

Primary Examiner—David C. Nelms
Attorney, Agent, or Firm—Koda & Androlia

[57] ABSTRACT

The basic concept of the fuel gauge of this invention is to make use of the difference in refraction of liquid and air by means of optical fibres. More particularly, the fuel gauge includes a first set of optical fibers connected to a light source, a second set of optical fibres connected to a display unit and an optical medium mounted between the first and second sets of the optical fibres in such a manner that the light transmitted through the first set of the optical fibres is allowed to enter the second set of the optical fibres only through those optical fibres which are submerged in fuel. The light transmitted to the second set of the optical fibres may be converted into a visual signal with an existing display mechanism.

5 Claims, 2 Drawing Sheets

OPTICAL FUEL GAUGE FOR VEHICLES

This is a continuation of application Ser. No. 178,144, filed Apr. 6, 1988 now abandoned.

BACKGROUND OF THE INVENTION

1. Field of the Invention

This invention relates to a structure of a fuel gauge for vehicles including automobiles, motorcycles and boats, and more particularly to a fuel gauge which utilizes fibre optical devices.

2. Prior Art

In modern industry, it is one of the most important considerations to have precise and reliable fuel gauge provided in vehicles. In achieving this object, a number of structure have been disclosed and practiced in the past.

Among them all, a float ball mechanism has been considered the most common and reliable. According to the float ball mechanism, vertical movements of the ball floating on the surface of the fuel are converted into rotational movements at the end of an arm connected to the ball. Such rotational movements may further be converted into electric signals which be displayed in a conventional visual manner.

For example, the movement of the float ball in a fuel tank in an automobile may be converted into a visual signal displayed on the surface of the dashboard of an automobile.

However, it has been recognized that the float ball mechanism frequently causes inaccuracy problems. Such problems commonly occur in the following circumstances:

(1) When a vehicle is moving:

Since the level of the fuel cannot be even, the float ball would not reflect the actual volume of the fuel in the tank. As a result, the measurement presented in a display would not be accurate. Typically a driver of an automobile often suffers from misjudgment of the fuel gauge caused this inaccuracy problem.

(2) When the float ball mechanism gets old:

It is perceptible as the mechanism being used for a certain period of time that the mechanical connections may become loose or deformed causing inaccurate movements.

Furthermore, the float ball mechanism cannot be free from a limitation in measuring the liquid content when it gets close to empty. More specifically, the lowest level measurable by the float ball would not represent the real empty level of the fuel content, since the bottom part of the ball beneath the fuel level reaches the lowest level before the fuel level gets to the real empty level.

As a result, it is not unusual that the operators could not fully rely on those gauges using the float ball mechanism.

Therefore, attempts have been made to build a fuel gauge which is more accurate and reliable. Some of these attempts are disclosed in the patents as follows: U.S. Pat. No. 3,713,338; U.S. Pat. No. 3,794,428; U.S. Pat. No. 4,450,722; U.S. Pat. No. 4,630,476, U.S. Pat. No. 4,440,022 and U.S. Pat. No. 4,156,149.

Among these patents, U.S. Pat. No. 3,713,338 discloses some unique features in that a set for fibre optical members vertically arranged is used to detect the level of the fuel. However, this system requires a rather complex structure, particularly in that first and second chambers separated by a flexible diaphragm and a transparent vessel connected to the first chamber are needed outside of the tank. According to this structure, it is the level of the light absorbing liquid contained in the transparent vessel that is measured by the optical members. In other words, this structure does not allow direct measurement of the fuel level in the tank to be taken resulting in more manufacturing cost and insufficient accuracy.

SUMMARY OF THE INVENTION

Accordingly, it is the primary object of this invention to overcome the above described difficulties accompanying conventional fuel gauges.

More specifically, an object of this invention is to provide a fuel gauge which uses an optical assembly unit for accurately sensing the fuel content.

Another object of this invention is to provide a fuel gauge including an optical assembly unit which is simple and inexpensive to build.

Another object of this invention is to provide a fuel gauge including an optical assembly unit which utilizes the difference in refraction between fuel and air.

In keeping with the principles of this invention, the objects are accomplished by a unique structure provided in a fuel tank including a first set of optical fibres connected to a light source, a second set of optical fibres connected to a display unit and an optical medium mounted between the first and second sets of the optical fibres in such a manner that the light transmitted through the first set of the optical fibres is allowed to reach the receiving ends of the second set of the optical fibres which are submerged in fuel. The light transmitted to the second set of the optical fibres may be converted into a visual signal with an existing display means including LED, LCD and the like. The basic concept of this invention is to utilize the difference in the refraction of liquid and air.

BRIEF DESCRIPTION OF THE DRAWINGS

The novel features of this invention are set forth in the appended claims; however, those features and other details of this invention will be best understood with reference to the following detailed description of the illustrative embodiments when read in conjunction with the accompanying drawings in which like parts are designated by like reference numerals or characters.

DETAILED DESCRIPTION OF THE INVENTION

Figure 1:
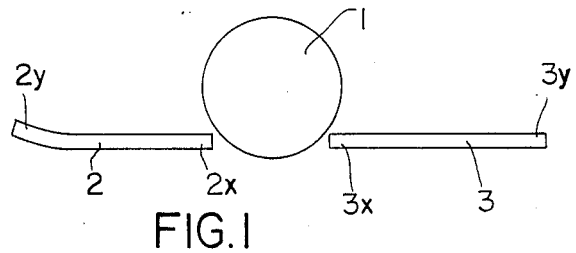
FIG. 1 shows a top plan view of a basic structure of an embodiment of this invention.
Figure 2:
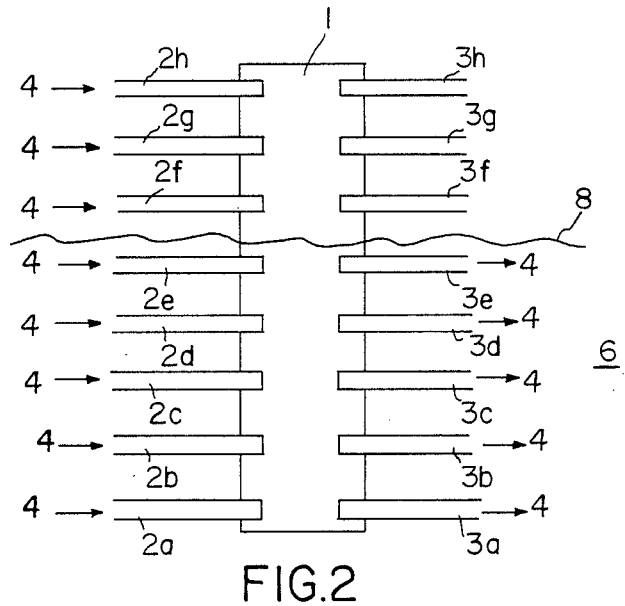
FIG. 2 shows an explanatory diagram illustrating the basic concept of this invention.

First referring to FIGS. 1 and 2, there is shown the basic arrangement of the fuel gauge unit of this invention. More specifically, a cylindrical optical medium 1 is sandwiched between a first set of light emitting optical fibres $2a$ to $2h$ for light emitting and a second set of light receiving optical fibres $3a$ to $3h$ for light receiving.

The cylindrical optical medium 1 and the fibres 2 and 3 are made of substantially transparent material such as glass and acrylic resin. The first and second sets of the optical fibres 2a to 2h and 3a to 3h are disposed to the optical medium 1 with a relatively short distance therebetween and at an angle selected to suit the size of the unit and the refraction index of the material.

The first ends 2y of the optical fibres 2 are exposed to a light source (not shown), and the second ends 3y of the optical fibres 3 are connected to the display device (not shown).

Now particularly referring to FIG. 2, the first set 2 and the second set 3 include eight optical fibres 2a to 2h and 3a to 3h respectively such that each one of the eight optical fibres 2a to 2h and 3a to 3h of the two sets form a pair facing each other across the cylindrical optical medium 1.

Figure 3:
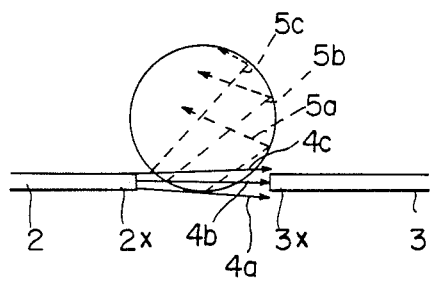
FIG. 3 shows a side view briefly illustrating the operation of this invention.

In FIG. 3, there is shown the basic principle of the fuel gauge of this invention. When the optical fibres 2 and 3 are submerged in the fuel, the light 4 emitted from the light emitting end 2x of the optical fibre 2 travels through the fuel 6 and enters the optical medium 1. The light 4 further travels through the optical medium 1 and the fuel 6 until it reaches the receiving end 3x of the optical fibre 3. In the course described above, the light 4 may show some diffusion as illustrated by arrows 4a to 4c depending upon various factors such as the material of the optical medium 1 and the distance and angle between the end 2x and the optical medium 1.

As a result, some part of the light 4 may not reach the light receiving end 3x. Nonetheless, the optical assembly unit of this invention can be so arranged that the major portion of the light 4 reaches the light receiving end 3x by adjusting the size, distance, angle, and material on the optical medium 1 and the optical fibres 2 and 3.

Further referring to FIG. 3, when the optical fibres 2 and 3 are not submerged in the fuel, the light 5 emitted from the end 2x of the light emitting optical fibre 2 takes a course as shown by arrows 5a, 5b and 5c resulting in substantial diffusion. This causes the light 5 not to reach the light receiving end 3x of the optical fibre 3.

The fuel gauge of this invention takes advantage of the difference in the index of refraction between the air and the fuel. More specifically, only when the optical fibres 2 and 3 are submerged in the fuel 6, the light 4 from the light emitting optical fibre 2 may reach the light receiving optical fibre 3, thereby each pair of the optical fibres 2a to 2h and the optical fibres 3a to 3h may function as a light sensor.

Now referring back to FIG. 2, there is shown a side view of the optical fibre assembly unit utilizing the concept described in the above. Each one of the eight light emitting optical fibres 2a to 2h is arranged to face the corresponding light detecting optical fibres 3a to 3h.

In FIG. 2, only the optical fibres 2a to 2e and 3a to 3e are submerged in the fuel 6, where the light 4 emitted from the optical fibres 2a to 2e alone may reach the light optical fibres 3a to 3e. As the fuel is consumed and the level of the fuel becomes lower, those optical fibres 2e and 3e placed at a next lower position may come out from the fuel 6.

Thus, the optical fibre assembly unit of this invention may accurately reflect the level of the fuel by allowing only those light emitting optical fibres submerged in the fuel to be able to transfer the light 4 to their corresponding light detecting optical fibres.

Figure 4:
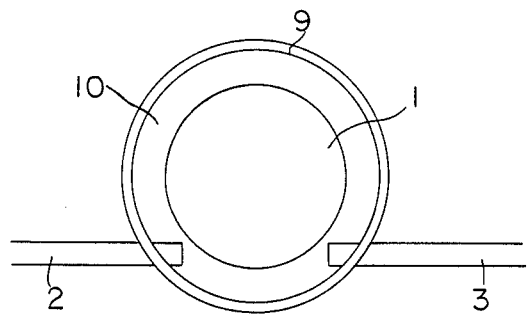
FIG. 4 shows a top plan view of another embodiment of this invention.

FIG. 4 represents another embodiment of this invention, where the optical fibre assembly unit is equipped with a cylindrical protector 9 which is large enough to encircle the optical medium 1 with some space 10 therebetween. The protector 9 is provided with apertures (not shown) through which the optical fibres 2 and 3 may be inserted into the space 10. The fuel 6 is allowed to flow in and out of the space 10. This protector 9 will keep the fuel level stable within the space 10 encircled by the protector 10 even when the fuel tank is tilted. Accordingly, this will particularly be advantageous for an automobile driver who has to drive on uneven roads.

Figure 5:
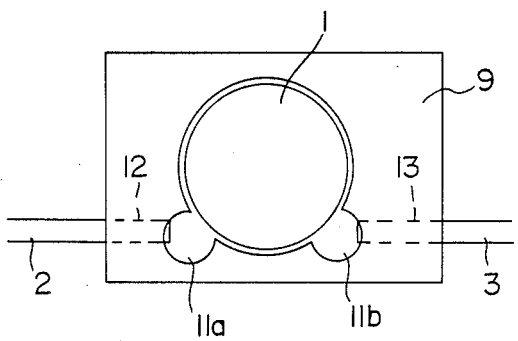
FIG. 5 shows a top plan view of still another embodiment of this invention.

FIG. 5 shows another embodiment of this invention, where the optical medium 1 is closely embraced by a protector 9 which is preferably made of substantially non-transparent material, such as aluminum. The protector 9 has two cylindrical recesses 11a and 11b therein in such manner that the optical medium 1 cuts into the end portion of those recesses 11a and 11b. The protector 9 also has two sets of apertures 12a–h and 13a–h such the optical fibres 2a to 2h and 3a to 3h may be inserted thereinto. The ends of those optical fibres 2 and 3 are so arranged as to be exposed into the recesses 11a and 11b.

In practice, the material, size and angle must be chosen based upon specific needs in accordance with the concept of this invention so that the light emitted from the light emitting optical fibres 2 may travel through the recesses 11a and 11b and the optical medium 1 to reach the light receiving optical fibres 3 only when particular optical fibres 2 and 3 are submerged in the fuel 6.

In building a fuel gauge according to the teachings of this invention, one can determine the number of optical fibres based upon the requirement of accuracy. It should be obvious that the more optical fibres used, the more accurate measurement is obtainable.

Also, in a simple apparatus, the fuel gauge of this invention may be operable without having any additional display device. More particularly, the ends of the light receiving optical fibres may be consecutively disposed to form a dotted line, wherein only the end portions of those fibres submerged in the fuel would glow indicating the level of the remaining fuel. This arrangement can typically be applicable to a fuel gauge for a motorcycle.

In a more complex apparatus, the fuel gauge of this invention may have such an arrangement that the end portions of the optical fibres of the second set are connected to a means for converting light signals to into electric signals. This arrangement will allow the remaining fuel content to be indicated in the form of a digital display.

In all cases it is understood that the above described embodiments are merely illustrative of but a small number of the many possible specific embodiments which represent application of the principles of the present invention. Furthermore, numerous and varied other arrangements can be readily devised in accordance with the principles of the present invention by these skilled in the art without departing from the spirit and scope of the invention.

We claim:

1. A fuel gauge to be provided in a fuel tank for vehicles, comprising:
   a light source;
   a set of light emitting optical fibres, said fibres being arranged such that first light receiving ends thereof are disposed adjacent to said light source and second light emitting ends thereof are vertically distributed;

a set of light receiving optical fibres, said fibres being arranged such that a first light receiving end thereof is aligned along a straight line optical path with a corresponding second light emitting end of said light emitting optical fibre and second ends thereof are disposed to a display means; and a solid optical medium provided in between and in said optical straight line path between said second ends of said light emitting optical fibres and said first ends of said light receiving optical fibres with a fluid space between said ends of said light emitting and light receiving optical fibers and said optical medium, said medium being positioned such that light emitted from said second end of said light emitting optical fibres reaches said first end of said light receiving optical fibres only if fuel is disposed on said fluid space between said ends and said optical medium.

2. A fuel gauge in accordance with claim 1, wherein said optical medium is in a cylindrical shape.

3. A fuel gauge in accordance with claim 1, further comprising a protector encircling said optical medium, said protector being to cover said optical medium and said second ends of said light emitting optical fibres and said first ends of said light receiving optical fibres.

4. A fuel gauge in accordance with claim 3, wherein said protector has a first depression into which said second ends of said light emitting optical fibres are exposed and a second depression into which said first ends of said light receiving optical fibres are exposed.

5. A fuel gauge in accordance with claim 4, wherein said second ends of said light receiving optical fibres are connected to a display device.

* * * * *